JOHN GARDNER.
Improvement in Steering Apparatus.

No. 118,923. Patented Sep. 12, 1871.

UNITED STATES PATENT OFFICE.

JOHN GARDNER, OF NEW YORK, N. Y.

IMPROVEMENT IN STEERING APPARATUS.

Specification forming part of Letters Patent No. 118,923, dated September 12, 1871.

*To all whom it may concern:*

Be it known that I, JOHN GARDNER, of New York city, in the county and State of New York, have invented a new and useful Improvement in Ship's Steering Apparatus; and I do hereby declare that the following is a full, clear, and exact description thereof, which will enable others skilled in the art to make and use the same, reference being had to the accompanying drawing forming part of this specification, in which—

Figure 1:
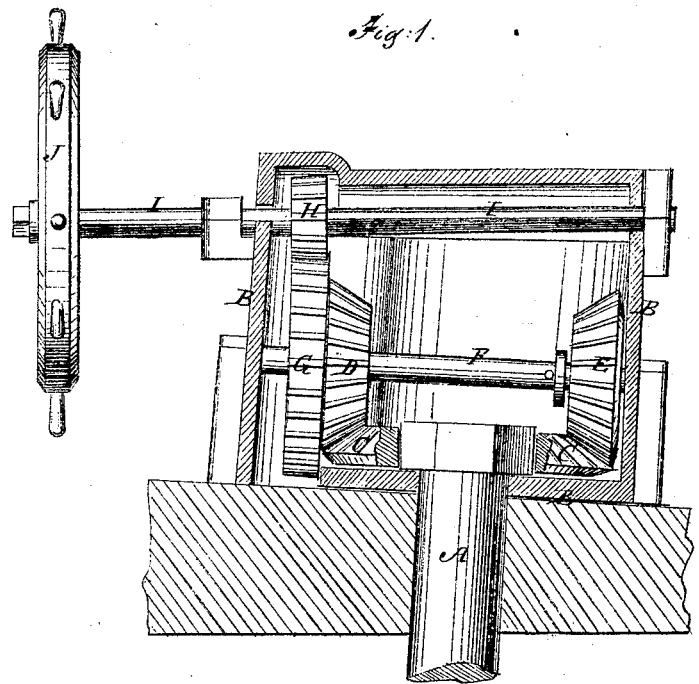
Figure 2:
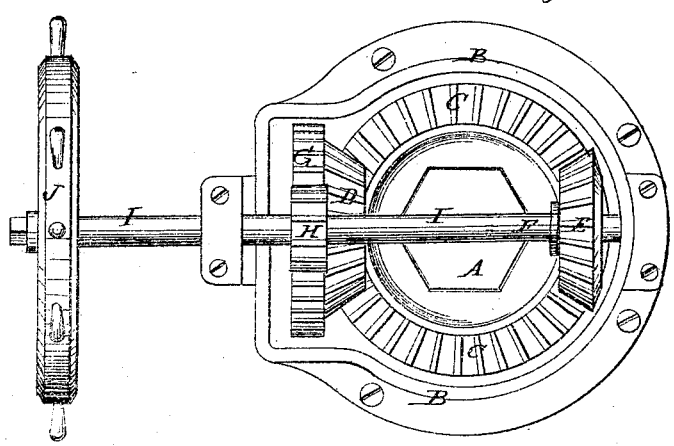

Figure 1 is a side view of my improved steering apparatus partly in section through the box, and part being broken away to show the construction. Fig. 2 is a top view of the same, the cover of the box being removed and part of the counter-shaft being broken away.

Similar letters of reference indicate corresponding parts.

My invention has for its object to improve the construction of a ship's steering apparatus, especially when the rudder-post is set raking or inclined, so as to make it more convenient and efficient in use; and it consists in the counter-shaft and bevel-gear wheels, arranged in connection with the steering-wheel, main shaft, and its bevel-gear wheels, as hereinafter more fully described.

A represents a raking or inclined rudder-post, the upper end of which is made polygonal in form and passes up through a hole in the bottom of the box or casing B, and fits into a hole in the large bevel-gear wheel, C, so that the said rudder-post can rise and lower without affecting the operation of the steering apparatus. The bevel-gear wheel C revolves upon the bottom of the box or casing B, and into its teeth upon its front and rear sides mesh the teeth of two bevel-gear wheels, D E, one of which wheels, as D, is rigidly attached to the main shaft F. The outer wheel, as E, runs loosely upon the shaft F, and serves simply to hold the wheel C down to its seat and give steadiness of motion to the gearing. The shaft F is placed at right angles to the axis of the rudder-post A, and its journals revolve in bearings attached to or formed in the box or casing B. To the shaft F is attached a gear-wheel G, into the teeth of which mesh the teeth of the gear-wheel H attached to the counter-shaft I, the journals of which revolve in bearings attached to the box or casing B. The shaft I is set in a horizontal line, and is thus at an angle with the shaft F, said angle being greater or lesser, according to the rake or inclination of the rudder-post A. The gear-wheels G H are beveled more or less to correspond with the angle between the shafts F and I. To the forward end of the shaft I is attached the steering-wheel J, which is thus always vertical, and consequently in the best position to be operated by the steersman.

Having thus described my invention, I claim as new and desire to secure by Letters Patent—

The counter-shaft I and bevel-gear wheels H G, arranged in connection with the steering-wheel J, shaft F, and bevel-gear wheels E D C, substantially as herein shown and described, and for the purpose set forth.

The above specification of my invention signed by me this 14th day of June, 1871.

JOHN GARDNER.

Witnesses:
 JAMES T. GRAHAM,
 T. B. MOSHER. (98.)